US008356001B2

(12) United States Patent
Collazo (10) Patent No.: US 8,356,001 B2
(45) Date of Patent: Jan. 15, 2013

(54) SYSTEMS AND METHODS FOR APPLICATION-LEVEL SECURITY

(75) Inventor: Carlos Miguel Collazo, San Mateo, CA (US)

(73) Assignee: Xybersecure, Inc., Miami, FL (US)

( * ) Notice: Subject to any disclaimer, the term of this patent is extended or adjusted under 35 U.S.C. 154(b) by 683 days.

(21) Appl. No.: 12/468,739

(22) Filed: May 19, 2009

(65) Prior Publication Data

US 2010/0299292 A1 Nov. 25, 2010

(51) Int. Cl.
*G06F 15/18* (2006.01)
*G06F 9/00* (2006.01)
*G06F 11/00* (2006.01)

(52) U.S. Cl. .................. 706/14; 726/11; 726/22
(58) Field of Classification Search .................. None
See application file for complete search history.

(56) References Cited

U.S. PATENT DOCUMENTS

| 7,307,999 | B1 | 12/2007 | Donaghey |
| 2003/0172166 | A1* | 9/2003 | Judge et al. ............. 709/229 |
| 2006/0179296 | A1 | 8/2006 | Bartlett et al. |
| 2009/0100518 | A1* | 4/2009 | Overcash ............. 726/22 |

OTHER PUBLICATIONS

International Search Report dated Jul. 2, 2010, Application No. PCT/US2010/033193.
"IDP Series Intrusion Detection and Prevention Appliances", Product Category Brochure, Juniper Networks, Inc., 15000025-002-EN, Mar. 2009.
Sorensen, Sarah, "The Need for Pervasive Application-Level Attack Protection", Juniper Networks, Inc., 2004.
Sorensen, Sarah, "Intrusion Detection and Prevention", Juniper Networks, Inc., 2006.
Sorensen, Sarah, "Juniper Networks Deep Inspection Firewall", Juniper Networks, Inc., 2004.
"Juniper Networks Integrated Firewall/VPN Platforms", Product Category Brochure, Juniper Networks, In., 15000024-002-E3, Mar. 2009.
Crawford, Scott, "What application-level security really means", Network World, Dec. 13, 2004, http://http://www.networkworld.com/newsletters/nsm/2004/1213nsm1.html.

* cited by examiner

*Primary Examiner* — Alan Chen
*Assistant Examiner* — Paulinho E Smith
(74) *Attorney, Agent, or Firm* — Ropes & Gray LLP (57) ABSTRACT

A system and method for application-level security is disclosed. Application-level security refers to detecting security threats from functional user behavior. Information about functional user behavior is transformed into a behavior session. The behavior session is transformed into a behavior pattern. The behavior pattern is correlated with evaluation patterns to detect potential security threats. Behavior patterns are collected over time to improve analysis.

38 Claims, 6 Drawing Sheets

SYSTEMS AND METHODS FOR APPLICATION-LEVEL SECURITY

BACKGROUND OF THE INVENTION

This invention relates generally to application-level security systems, and more particularly, to web application security systems collecting information about application-level functional user behavior, and correlating the information collected with evaluation patterns to detect security threats before the attacks occur.

Security is one of the largest concerns and markets for Internet. The security threat to Internet-based commerce grows daily, as more users and companies access sensitive information over the Internet, such as credit card information and employee records. The majority of the solutions for Internet security are focused on the network, the operating environment of the servers, and the data.

For example, one of the prevailing solutions to Internet security has been network firewalls. Network firewalls block unauthorized access to assets and allow certain kinds of access to occur (e.g., for authorized users such as customers). For example, a network firewall can block communications originating from a particular IP address. Network-level security solutions such as hardware firewalls usually implement rules or access control lists for determining access permissions. For example, hardware firewalls can protecting a private network by limiting the access permissions of outside network traffic.

Protection at the application-level, however, has been largely neglected. Web applications written and deployed without security as a prime consideration can inadvertently expose sensitive or confidential information, facilitate web site defacement, provide access to private networks, perpetrate denial of service (DoS) attacks, and facilitate unhindered access to back-end databases. The stakes are high, and threats must be detected and remediated, before an attacker has a chance to launch an attack against the application.

Attackers are discovering that manipulating applications to gain access through the open doors of the hardware firewall is more effective. These attacks work by exploiting the web server and the applications it runs to enter through the same open door in the perimeter defenses that normal users (e.g., customers) use to access the website. In such instances, attackers generally exploit vulnerabilities in the code of the web application. One example of an application-level attack is SQL injection. Web applications vulnerable to this type of attack often use user input, such as text input in form fields, to construct SQL queries by concatenating the text received from the user with SQL code to form a SQL query. If the appropriate text is submitted through the form field such that a malicious query is formed instead of the intended query, the web application may return information not intended for the user, such as passwords, or other kinds of personal information.

Existing security solutions aimed at application-level attacks, such as Juniper Network's network firewalls, offers a packet-level solution to inspect the payload of a packet and stores the history of network traffic to model application-level activities. For instance, to protect against SQL injection, the network firewall inspects the packet payload data for special symbols. However, these solutions inspect packets at the network-level and requires reassembly, scrubbing, and normalization, because application-level activity is fragmented and out of order. The process of analyzing packet payloads to interpret the intent of the application data is difficult, cumbersome, and introduces significant overhead. Packet-level solutions cannot keep track of browser sessions easily, because session information, such as the data associated with browser session cookies, is not coherent at the network level. Packet-level solutions cannot also distinguish network traffic coming from one application to another easily. Packet-level solutions are also expensive, and can slow down the speed of the network significantly as the firewall filters these packets for application data. Furthermore, packet-level solutions cannot be adapted and modified easily based on the particular application. Additionally, packet-level solutions cannot accurately and adequately track functional behavior on an application, because packet-level solutions can only interpret and attempt to reconstruct the application-level user behavior from the raw packet data. Reconstruction of the raw packet data introduces ambiguity and reduces the performance of the security system. Moreover, existing solutions do not automatically learn new patterns of benign and/or malicious behavior, and can only work with a given set of threat signatures (i.e. threat signatures provided by the hardware vendor or system administrators).

It is difficult to distinguish malicious activity on the application-level (e.g., functional abuse) from normal, everyday web traffic at the network-level. Application attacks cannot be adequately prevented by intrusion-then-detection methods, network firewalls, or even encryption. There exists a need for a solution that can prevent application-level attacks and eliminate the shortcomings of the existing solutions.

SUMMARY OF THE INVENTION

In accordance with the principles of the present invention, systems and methods for detecting security threats before the attacks occur are disclosed. In the various embodiments described herein, generally speaking, web application security systems collect qualitative and/or quantitative information about application-level functional user behavior, transforming the information collected into behavior patterns comprising qualitative data with quantifiable values, and correlate the behavior pattern with evaluation patterns to detect security threats before the attacks occur.

Embodiments of the described security system discern between normal and malicious behavior (e.g., a customer entering a wrong password due to a typo versus an attacker performing a dictionary attack on the password, respectively) through real-time analysis and correlation of behavior patterns (e.g., in a browser session) in relation to other behavior patterns of the application, threat signatures, and overall usage of the web application. For example, the web application provided by a web server can be a database program, an email program, video game, an e-commerce web site, or other suitable web application. Functional user behavior with such application may include a timestamped user click on a button, text input in a form field, sequence of pages visited by the user, or other suitable user interaction.

The system uses a behavior analysis engine to transform the qualitative and/or quantitative information about functional user behavior on the web application into a behavior pattern, and uses a correlation engine to correlate the behavior pattern with each of a plurality of evaluation patterns using statistical analysis or any other suitable correlation methods. The qualitative and/or quantitative information collected about functional user behavior may be transformed into a behavior pattern comprising quantitative and/or qualitative information stored in a different format than the originally-collected data, such that the behavior pattern can be correlated easily with evaluation patterns (e.g., transform the collected data such that the format of the behavior pattern matches with the inputs of the correlation method). Evaluation patterns may be specific to the application being protected by the system. At least one of the evaluation patterns is associated with malicious behavior.

The process of transforming qualitative and/or quantitative information collected outputs a behavior pattern that comprises data that qualitatively describes the application-level functional user behavior. The qualitative data may include quantifiable values to facilitate storage and/or quantitative analysis such as statistical correlation. For example, raw data comprising a page sequence (e.g., timestamped HTTP page requests, both quantitative and qualitative) is transformed via analytical methods to determine whether the page sequence appears to be robotic or not (qualitative data and information on application-level functional user behavior). Whether a page sequence is robotic or not may be quantified as a "0" or "1", or alternatively, a range of values to describe the relative level of robotic behavior, such as "0.56" or "0.3".

The process of transforming information collected reduces the set of raw data collected into a manageable set of data for correlation. In some embodiments, the transformation process is integrated with the correlation process, where the transformation process may dynamically change depending on initial correlation results with certain evaluation patterns.

In some embodiments, the qualitative and/or quantitative information about functional user behavior is collected over a user behavior session by the web server hosting the web application. A user behavior session is defined as the end user behavior in using an application directly or indirectly from the time when the user begins to interact with the web application to the time when the user ceases to interact with the web application. For example, a browser cookie may be used to identify the user behavior session.

The security system has a frame construct to represent threat signatures. Each frame is a template for describing a profile of an application-level attack. A frame comprises attributes such as functional abuse traits, data injection, command injection, and threat signatures. In some embodiments, the frame attributes are automatically or manually populated by the system to create evaluation patterns that are application-specific.

An evaluation pattern can be implemented in many ways. For instance, an application-specific evaluation pattern can be a vector representing a list of functional abuse traits present in a specific attack on an email application. In another instance, the evaluation pattern can be implemented as an associative array with frame attributes as keys with values (e.g., "0" and "1") to represent the presence or absence of certain attributes. Alternatively, the values may be represented by a number between 0 to 100 as weights that represent the relative importance of finding that attribute in the behavior pattern. In some embodiments, a frame may represent a particular page sequence which may indicate functional abuse.

In a user behavior session, the qualitative and/or quantitative functional user behavior can be tracked, collected and stored using any suitable method. For example, client-side scripting, such as JavaScript code, on a web page can be used to track mouse movements and clicks on a web site. In some embodiments, a server object is installed on the web server hosting the web application to capture relevant requests (e.g., server-side scripting) from clients to the web server, such as page requests. The information about functional user behavior collected may be transformed into a behavior pattern, wherein the behavior pattern is defined by the presence or absence of certain attributes. These attributes may qualitatively describe the functional user behavior activity, and the values for those attributes may be quantitative to facilitate storage and/or correlation. These attributes may be application-specific. For instance, a behavior pattern may be implemented as a hash table for mapping relevant qualitative attributes (e.g., average time intervals between page hits on "book_eventA.html") to quantitative values (e.g., 0.35 hits/second). In another instance, a behavior pattern comprises a "0" or "1" as quantitative values to qualitative attributes to represent the presence or absence of those qualitative attributes (e.g., presence of "?&=" in the email address field submitted).

In some embodiments, user requests (e.g., HTTP requests) comprising information about functional user behavior are tracked during a user behavior session. Information about functional user behavior in the user request may comprise the timestamp of a page request, the application the request belongs to, identification of the user behavior session (e.g., browser session, cookies), request payload (e.g., URI, query string, header parameters, posted data), or any other suitable information about functional user behavior. In certain embodiments, a behavior pattern is associated with qualitative attributes that have quantifiable values associated with them. For instance, a qualitative attribute may be the presence of a regular expression in the text input entered by the user, and the quantifiable value may be a "0" or "1". In some embodiments, the information about functional user behavior is a page sequence. The page sequence is transformed into a behavior pattern comprising quantifiable values for the following qualitative attributes:

Variance of time intervals between each page request
    Average time intervals between each page request
    Whether "confirm_order.aspx" the most visited page in the sequence An example of quantitative values for the qualitative attributes above are:

0.08
    0.12 seconds
    1 (indicating "yes")

Raw data on information about functional user behavior is transformed into a behavior pattern using any suitable means. The resulting behavior pattern may comprise qualitative values as well, such as the page sequence itself. The behavior pattern is stored in the security system for further analysis.

The behavior pattern is correlated with each of the set of evaluation patterns. In some embodiments, the behavior pattern continues to be correlated with evaluation patterns as more information about application-level functional user behavior is collected. Correlation methods may comprise checking the quantitative values in the behavior pattern against some known value, such as a threshold. For instance, correlation may comprise checking the variance of time intervals between each page request against 0.03; if the variance is below 0.03, the page sequence may indicate a robotic, non-human-like functional user behavior/activity on the web application (e.g., qualitative data indicating user behavior is robotic).

In some embodiments, correlation is performed using statistical methods (e.g., classification methods) by finding the statistical correlation between the behavior pattern and each of the known evaluation patterns. Other correlation or classification methods used may include neural networks, nearest-neighbor classifiers, decision trees, or any other suitable classification techniques. The set of known behavior patterns may be organized by categories or may be related to each other in the form of a hierarchy, where other kinds of classification techniques may be more suitable.

In some embodiments, correlation is performed on the behavior pattern using pattern matching methods to match a page sequence over a user behavior session with a known page sequence pattern. In this case, the behavior pattern stored in the system is qualitative. The result of the correlation is used to determine whether the user behavior session is correlated with a security threat. Upon detecting a security threat, a remediation action is automatically executed to react to the security threat. For instance, the remediation action comprises contacting a system administrator about the security threat by email. In alternative embodiments, the remediation action is manually executed.

In some embodiments, the behavior patterns collected over time and over many users are used to detect new evaluation patterns. By reclustering the behavior patterns collected, the system learns, detects and extracts new abnormal and/or malicious evaluation patterns using any suitable clustering algorithm. The system also learns, detects and extracts normal patterns. The new evaluation patterns can be integrated with the existing set of evaluation patterns for future correlation and analysis.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
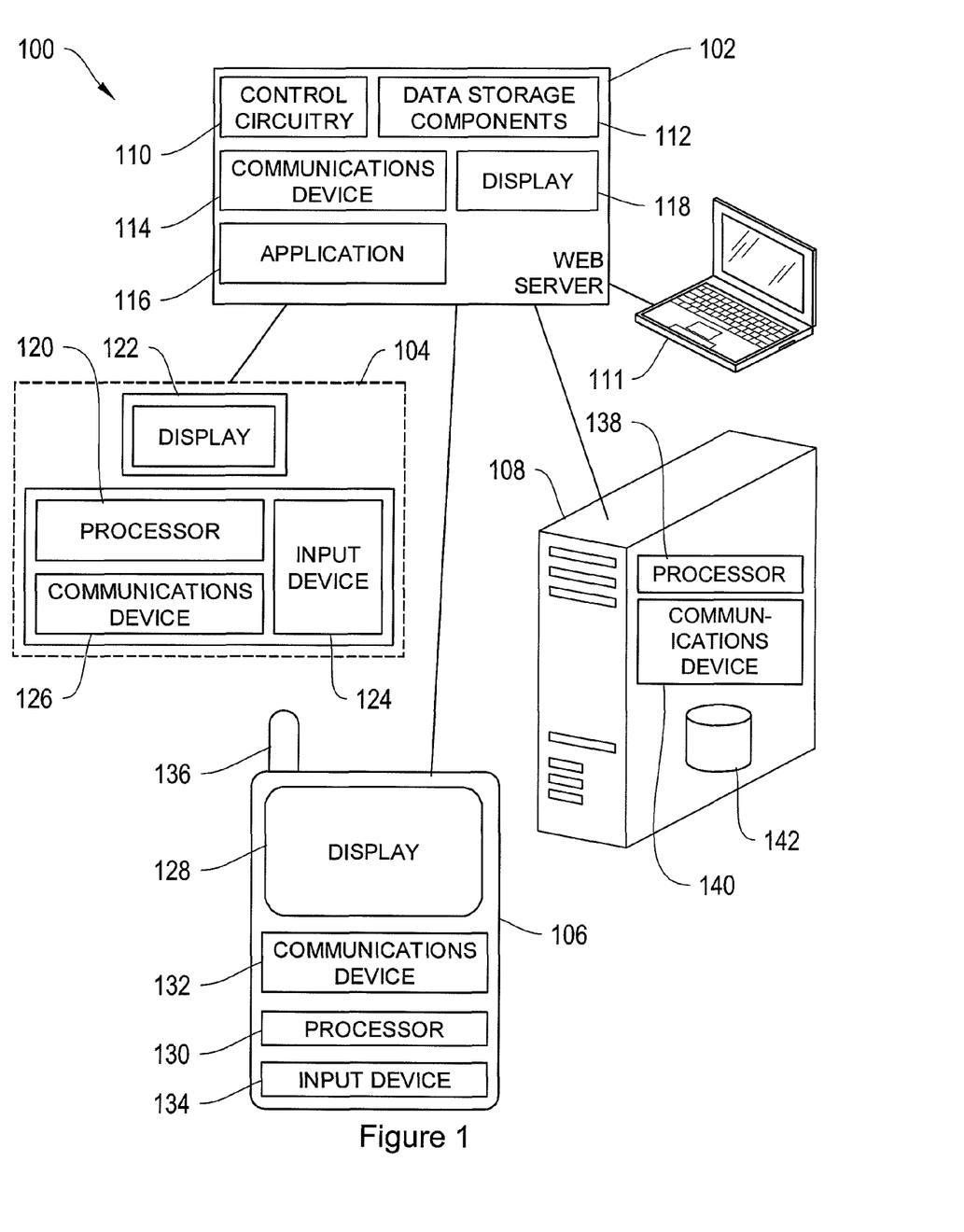
FIG. 1 is a diagram of an illustrative web application system in accordance with one embodiment of the invention.

FIG. 1 shows an illustrative web application system 100 in accordance with one embodiment of the invention, implemented as a server-client system. Web server 102 comprises a server computer running a computer program responsible for receiving requests from clients to serve web pages. Web server 102 may comprise control circuitry 110 to send and receive commands, requests, and other suitable data. The control circuitry 110 may be based on any suitable processing circuitry such as processing circuitry based on one or more microprocessors, microcontrollers, digital signal processors, programmable logic devices, etc.

Web server 102 may also include data storage components 112 for maintaining databases and files. Data storage components 112 may comprise random-access memory or hard disks. Alternatively, the databases and/or files may be stored in a different web server (not shown) from web server 102. Web server 102 may be accessible on the Internet, a local area network (LAN), wireless network, or any other suitable network, using communications device 114 such as an Ethernet card or data modem. Web server 102 may be configured to communicate with other servers or clients using communications device 114. Via communications device 114, web server 102 is accessible by various devices suitable for accessing the application running on web server 102.

Web server 102 runs one or more instances of web application 116. Any suitable approach may be used to provide web application 116 to a client. Any client (i.e., a user) may access and/or run an instance of web application 116 using any suitable approach. For example, a server-client based approach can be used by an email server to provide a web-based email application to a user. A user may use a blackberry to access, send and receive emails using a web browser implemented on the blackberry to access the web application. In another embodiment, a user may access the web application running on the server using remote desktop software (e.g., pcAnywhere by Symantec).

Web application 116 may be an online-banking web application, a social networking community web site, an online calendar application, an e-commerce application, or any other suitable web site. Web application 116 may support accessing and displaying data such as files and databases (e.g., to display device 118 or other devices coupled to the system). Web server 102 may use external storage for providing the third-party data. The data may include image files, audio files, or databases. Web server 102 may be configured to process HTTP requests and responses, or support interfaces such as PHP, ASP or MySQL. Web server 102 may be configured to serve static and/or dynamic content.

Web server 102 may be accessible by personal computer 104 or a laptop 111, or any other suitable user equipment devices. A plurality of devices such as computer 104, laptop 111, or any other suitable user equipment device may be connected to web server 102 concurrently. Personal computer 104 comprises processor 120 for sending requests to the web server to request data and for processing received data from the web server, and display 122 for displaying web pages. Personal computer 104 may include input device 124 such as a mouse, keyboard, touch pad, microphone, actuator, or any suitable input devices. Personal computer 104 may be used by a human user, or may be controlled by a bot or network of bots, or may be accessed by the human user or by a bot from a remote location. In some embodiments, a web browser is implemented on personal computer 104 to render web pages and data received from web server 102 to be displayed on display 122. Personal computer 104 may be configured to communicate with web server 102 using any suitable communications protocols and medium via communications device 126. Laptop 111 can be implemented in similar fashion.

In some embodiments, web server 102 is accessible by mobile device 106, such as a Palm Pilot, iPhone or Blackberry. Mobile device 106 comprises display 128 for displaying web pages, communications device 132 for sending requests to the web server to request data, and processor 130 for processing received data from the web server and displaying web pages to display 128. Mobile device 106 may include user input device 134 such as a touch screen, a scroll ball, keypad, microphone, haptic sensors, actuator, or any suitable input devices. Mobile device 106 may be used by a human user. In some embodiments, a web browser is implemented on mobile device 106 to render web pages and data received from the web server 102 on display 128. Mobile device 106 may be configured to communicate with web server 102 using antenna 136 and communications device 132 for over the air transmissions, or using any suitable communications protocols and medium.

In some embodiments, web server 102 is accessible by server 108. Server 108 comprises processor 138, communications device 140 and data storage components 142. Server 108 may be used as a web application acceleration server to improve the performance (e.g., to improve response time for certain web pages in application 116). Server 108 may be responsible for storing data for web server 102, such as for backup purposes, or for hosting a portion of the data provided by application 116. Server 108 may also provide functionalities for application 116 running on web server 102, such as credit card payment processing or some server/processor intensive process. Server 108 can be a mirror server running the same or part of application 116 running on the web server 102. Server 108 may be configured to communicate with web server 102 using any suitable communications protocols and medium via communications device 140. In some embodiments, the functionalities of web server 102 and server 108 are combined and provided from a single system at a single facility, or multiple systems at multiple facilities.

User equipment such as personal computer 104, mobile device 106 and laptop 111 may include any equipment suitable for providing a web application experience. Other examples of user equipment can include gaming systems (e.g., PlayStation), set top boxes, IP phones, etc. A user may use the user equipment to perform functions using web application 116. Using any input devices suitable to interface with the user equipment, a user may click on a link on a web page to request another web page from web server 108 (e.g., sends an HTTP request to the web server 104). Upon receiving the HTTP request, web server 108 processes the request and sends an HTTP response to the user equipment, where the response includes information needed to display the web page requested.

Web server 102 may not run a web application that provides web sites to clients. Web server 102 may provide data and other functions to an instance of an application or program running on user equipment. In one embodiment, web server 102 may provide flight schedule information to mobile device 106 used by an air traffic controller. Mobile device 106 may have a database program implemented thereon, such as an instance of FileMaker, or Microsoft Access. The database program may send database requests or queries for flight schedule data stored on web server 102. Web server 102 may also request third party data, such as weather information, from a remote server similar to server 108.

Web server 102 may be a file server configured to support cloud computing, providing the infrastructure and software as a service to users. Web server 102, or in conjunction with other distributed servers, may provide users with access to data, files and applications. For example, web server 102 may be used to support a project management tool for storing a repository of files associated with business projects, and to provide access of the data, files and applications to users around the world.

Figure 2:
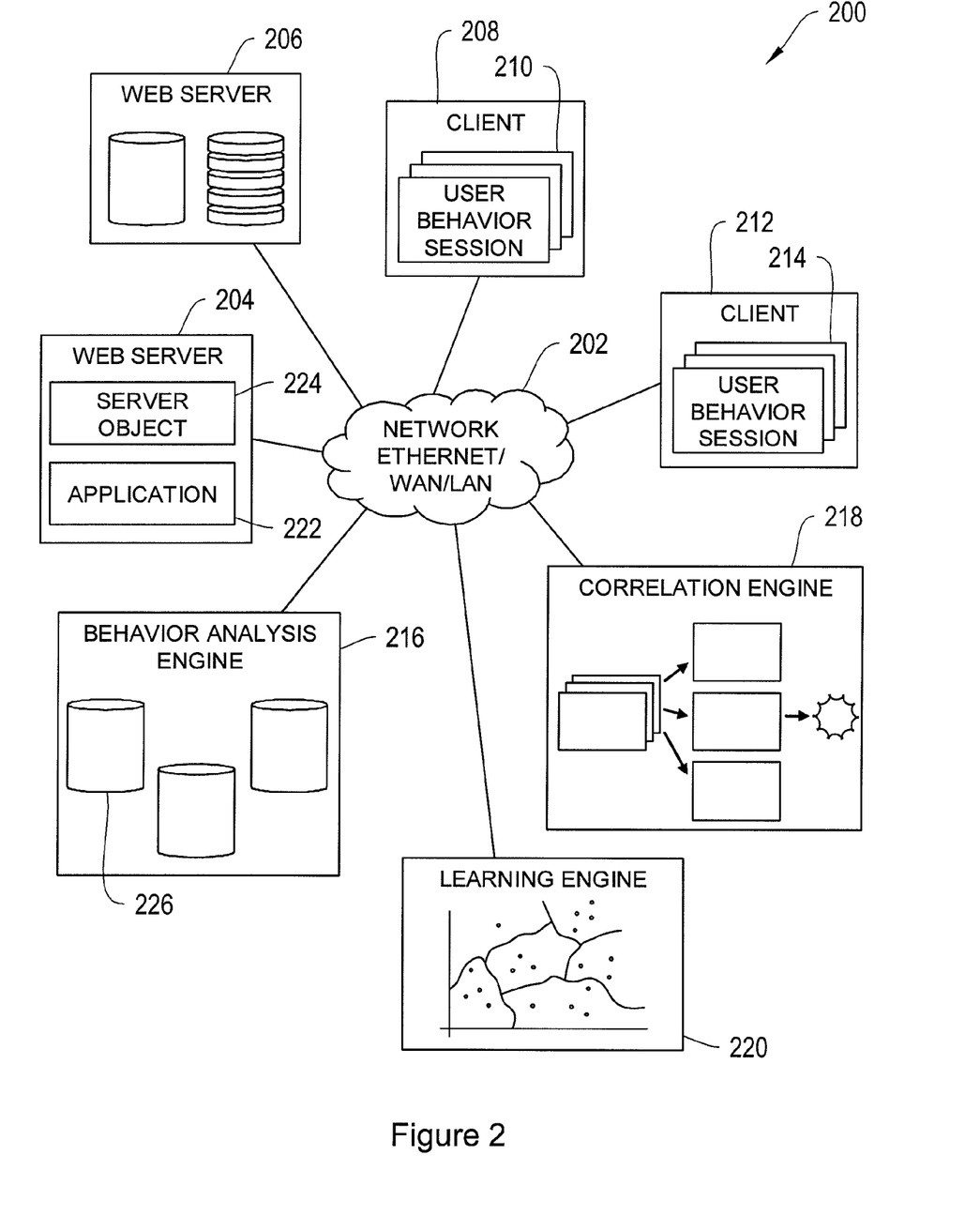
FIG. 2 is a diagram of an illustrative web application security system in accordance with one embodiment of the invention.

FIG. 2 shows an illustrative web application security system 200 in accordance with one embodiment of the invention. Web server 204, web server 206, client 208 and client 212 may be configured to communicate using a server-client approach or any other suitable approach. Web server 204, web server 206, behavior analysis engine 216, correlation engine 218, and learning engine 220 are configured to communicate with each other via network 202 (e.g., Internet, Wide Area Network, Local Area Network, cellular network, etc). For instance, network 202 allows web server 204 to communicate with client 208 and client 212 to provide a server-client web application experience (e.g., by communicating with HTTP requests and responses). Web server 204 and/or web server 206 may use network 202 to communicate data about functional user behavior to the behavior analysis engine 216. In some embodiments, the data about functional user behavior is captured on the server-side. In other embodiments, the data about functional user behavior is captured on the client-side.

Network 202 may be implemented in any suitable topology. Communications on network 202 may be any suitable communications protocol (e.g., HTTP over TCP/IP). Web server 204 implementing application 222 is coupled to network 202, and may be configured in a similar fashion as web server 102. Web server 206 is coupled to the network 202, and may be implemented in a similar fashion as server 108. In certain embodiments, the functionalities of the web server 204 and web server 206 are combined and implemented as a single system in a single facility. In alternative embodiments, those functionalities are implemented as a plurality of systems in a plurality of facilities. Web server 204 and/or web server 206 may be configured to send data associated with functional user behavior to behavior analysis engine 216. Correlation engine 218 or another server computer (not shown) may be configured to communicate with web server 204, web server 206, client 208, and client 212 to execute a remediation action in response to detecting malicious behavior.

Web server 204 and web server 206 are accessible by at least one client, for instance, client 208 and client 212. Client 208 and client 212 may be a personal computer, a mobile device, a laptop, a server, or any suitable device configured to communicate and access the web server 204 and/or web server 206, as described in relation to FIG. 1. Client 208 and client 212 may be configured to establish a user behavior session, user behavior session 210 and user behavior session 214 respectively (e.g., browser sessions as established by a browser cookie). In some embodiments, each client machine may establish more than one user behavior sessions. Although only client 208 and client 212 is shown, other clients implemented in a similar fashion may also establish behavior sessions. Multiple clients may be connected to web server 204 or web server 206 at the same time.

In some embodiments, a user behavior session, such as user behavior session 210 and user behavior session 214, defines the session where characteristics of functional user behavior on an application are collected. A user behavior session may be associated with a particular browser cookie. The information that security system 200 keeps track of during a user behavior session may include a web page or screen sequence navigated by the user, along with the time intervals associated with each page. Other information about functional user behavior may include input in web pages, screens, or forms of the application. Other examples may include timestamped user clicks or touch strokes within a web page or screen of the application. The functional user behavior may be processed and tagged by the context of the behavior. For instance, a click on an image on a web page may be tagged with a description of the image (e.g., "information icon"). In some embodiments, functional user behavior in a browser session on an application is monitored and tracked over time, and the information about the functional user behavior collected during the browser session (i.e., a user behavior session) is transformed and stored in a behavior pattern.

Tracking functional user behavior in a user behavior session improves upon tracking a single connection between clients and servers (i.e., tracking traffic to and from a single IP address). Blocking and protecting against a single connection (i.e., IP address) may be ineffective because a hacker or abusive user may try and establish connections using multiple IP addresses to launch attacks.

In some embodiments, the information about functional user behavior is analyzed by behavior analysis engine 216.

The qualitative and/or quantitative information about functional user behavior may be captured by server object 224 installed on web server 204. The information captured by server object 224 (or a client-side script) may be communicated to behavior analysis engine 216 over network 202 for further processing. Behavior analysis engine 216 may be implemented on the web server 204 or web server 206, or may be implemented as a separate server, or as multiple servers. Behavior analysis engine 216 may be configured to communicate with clients of the application 222 (e.g., client 208 and client 212), web server 204 and web server 206 to collect qualitative and/or quantitative information about functional user behavior. In certain embodiments, behavior analysis engine 216 is implemented in a distributed server system, where the collected information is quickly synchronized across the network. Behavior analysis engine 216 may be configured to monitor, track, store, transform, and analyze functional behavior on web application 222. Behavior analysis engine 216 may be configured to track and collect user behavior sessions for a part of web application 222, or may be configured to track and collect user behavior sessions for multiple web applications.

In some embodiments, a behavior tracker script (e.g., JavaScript file) is installed on pages of web application 222 to track user clicks or text input or any functional user behavior. The behavior tracker script and behavior analysis engine 216 may be configured to track and store a predefined set of various kinds of functional user behaviors. Behavior analysis engine 216 may also track non-functional user behavior (e.g., IP/TCP packet header data sent between servers and clients), or work with network firewalls to track other data. Server-side scripts may be installed as a server object 224 on web server 204 and web server 206 to track requests and responses between the servers and clients. The scripts may be configured to send data associated with functional user behavior to a separate data storage location, such as relational database 226 or any other suitable data storage components on behavior analysis engine 216 for further analysis. Behavior analysis engine 216 may be configured to organize incoming data associated with functional user behavior into user behavior sessions using browser cookies. The data collected may be aggregated, processed, transformed and analyzed by behavior analysis engine 216. In some embodiments, information about functional user behavior is transformed from raw data collected from users and/or clients into behavior patterns, where the behavior pattern is in a format that matches with the inputs of the correlation methods. The behavior patterns stored and collected in relational database 226 may be used by learning engine 220 to improve the algorithms running on behavior analysis engine 216 and correlation engine 218.

In some embodiments, the functional user behavior is tracked by server object 224 in web server 204, and the information about the functional user behavior in the user behavior session is stored in relational database 226 in behavior analysis engine 216. For instance, an HTTP request for a web page from a user may be stored as a new record in relational database 226. The information and records in relational database 226 may be aggregated during a user behavior session to form a behavior pattern that represents and qualitative describe application activities within a browser session. Page history during a user behavior session may be stored as a hash table for quick retrieval and access. The information aggregated may be further processed and transformed into a behavior pattern. For instance, the raw data gathered during a user behavior session may be transformed into a behavior pattern by representing the presence of certain user input characteristics and presence of pages in the page sequence as a multidimensional vector in a relational database. The behavior pattern qualitatively describes application-level functional user behavior and may further comprise quantifiable values for certain qualitative attributes and characteristics of functional user behavior.

In some embodiments, page sequence in a user behavior session may be transformed into a behavior pattern by using a Markov chain. The Markov chain may have a plurality of states. The Markov chain may change the current state depending on the next page in the page sequence in a user behavior session. For instance, a Markov chain may model a page sequence in a user behavior session, and at each page request, behavior analysis engine 216 may update the current state of the Markov chain. With a suitable Markov chain to model page history of a user as page requests are processed, the current state can reflect previous page visits in the page sequence. The Markov chain allows pattern matching to occur without doing a full search on the sequence each time a new page request is received at behavior analysis engine 216.

In one embodiment, correlation engine 218 is implemented to correlate behavior patterns associated with functional user behavior during a particular behavior session (e.g., aggregated by behavior analysis engine 216 over a browser session) with a set of evaluation patterns (e.g., a set of known behavior profiles). The raw data (qualitative and or quantitative) associated with functional user behavior collected from users and/or clients may be transformed into a format that matches the input of the correlation engine 218. The data in this format is stored as a behavior pattern, and the data is qualitative and/or quantitative. The raw data of an HTTP request (e.g., POST) may be parsed to look for attributes in the evaluation patterns (e.g., parsing for particular regular expressions).

In an illustrative embodiment, the result of parsing the HTTP requests may be transformed into a vector that keeps track of whether certain regular expressions have appeared in the HTTP requests. An example of a behavior pattern is:

$Q=[0, 1, 1, 0, 1, 1, 0, 0, 0]$ wherein each element in the vector represents the presence or absence of certain regular expressions (e.g., presence of .exe, presence of //*, presence of %+", presence of &&=, etc). An example of an evaluation pattern representing a malicious profile is:

$E=[0, 1, 1, 0, 0, 1, 0, 0, 1]$ where each element in the vector represents the presence or absence of certain regular expressions. Correlation engine 218 may use the vector to find the dot product of the two vectors (Q.E) to determine the similarity between the two vectors. If the result of the dot product is greater than a certain threshold (e.g., threshold =3), correlation engine 218 considers the behavior pattern Q as a match with evaluation pattern E. A match with an evaluation pattern associated with malicious activity may invoke a remediation action, such as session termination.

Correlation engine 218 correlates current behavior patterns with known evaluation patterns. For instance, information about page sequence in a user behavior session stored in relational database 226 may be transformed into a state in a Markov chain; the state may be used as part of the correlation process to determine whether the current state is associated with malicious behavior or not. Evaluation patterns will be described in further detail in relation to FIG. 5. The correlation engine and the algorithms implemented thereon may be automatically or manually updated to reflect additional information learned about user behavior and new information about the application. The correlation engine 218 may be implemented differently depending in part on application 222 running on web server 204.

In certain embodiments, results of correlations are tracked and reported to system administrators for further inspection and analysis. Results may also be used to train (e.g., using learning engine 220) the classification system in correlation engine 218. Alternatively, results may be used to recluster the set of behavior patterns in learning engine 220.

In some embodiments, learning engine 220 is implemented to learn from behavior patterns collected by behavior analysis engine 226 and the results from the correlation engine 218 using any suitable artificial intelligence learning algorithms. Learning engine 220 is configured to update the set of known behavior patterns over time. For instance, based at least in part on the behavior patterns collected, the learning engine can recluster the behavior patterns against the set of known evaluation patterns to detect new evaluation patterns. In another instance, learning engine 220 can use information about past attacks (e.g., such as the time frame of a past attack) as a heuristic to recluster the behavior patterns. Learning engine 220 may use a combination of heuristics and evolutionary algorithms. Heuristics may include information about past attacks, such as the locale of where the past attacks originated from. The new evaluation patterns learned from the reclustering process can be integrated with the set of known evaluation patterns in correlation engine 218. System 200 may modify the correlation engine 218 by incorporating new evaluation patterns detected in learning engine 220. The new evaluation patterns may become more specific to application 222 that system 200 is protecting, and thereby improve the performance of detecting security threats. The new evaluation patterns may represent new user behavior patterns, perhaps due in part to changes in the application or changes in user activities on the application. System 200 can then adapt to those changes automatically, without requiring manual re-configuration by the system administrator.

Clustering methods may include artificial intelligence algorithms such as hierarchical clustering, partitional clustering and spectral clustering. Learning engine 220 may be adapted and modified to reflect changes in application 220, new features tracked by system 200, new kinds of functional behavior, changes in the distribution of the functional user behaviors, or new knowledge about methods used by hackers. The clustering method may adapt to behavior patterns collected, or any other factors. Learning engine 220 may run automatically and continuously over time, or it may run at scheduled time intervals, or it may run as instructed by system administrators.

By updating the set of evaluation patterns, the performance of the system can improve as new evaluation patterns are learned. As described in relation to learning engine 220, the system 200 collects information for behavior patterns in current user behavior sessions or past user behavior sessions. Learning engine 220 continuously or discretely correlates the behavior patterns collected with the set of known evaluation patterns. As more information is known about distribution of functional user behavior, the behavior patterns collected may be reclustered by learning engine 220 to detect and learn new evaluation patterns. For instance, as the application is being used by users over time, normal functional user behavior patterns may emerge as more users use the web site, and those emerging patterns may not have existed as part of the set of evaluation patterns. In some embodiments, abnormal behavior may emerge as more users use the web site. For example, a group of hackers may have discovered a potential vulnerability of the application, and may attempt a series of attacks. The hackers' attempts can be detected by learning engine 220.

The learning process in learning engine 220 may take place online and/or offline on a regular time basis. New evaluation patterns found using learning engine 220 can be incorporated offline with the behavior analysis engine 216 and correlation engine 218 via an automatic process.

In operation, behavior analysis engine 216, correlation engine 218, and learning engine 220 may be implemented on multiple servers, or all or a subset of the engines can be combined and implemented on a single individual server.

Figure 3:
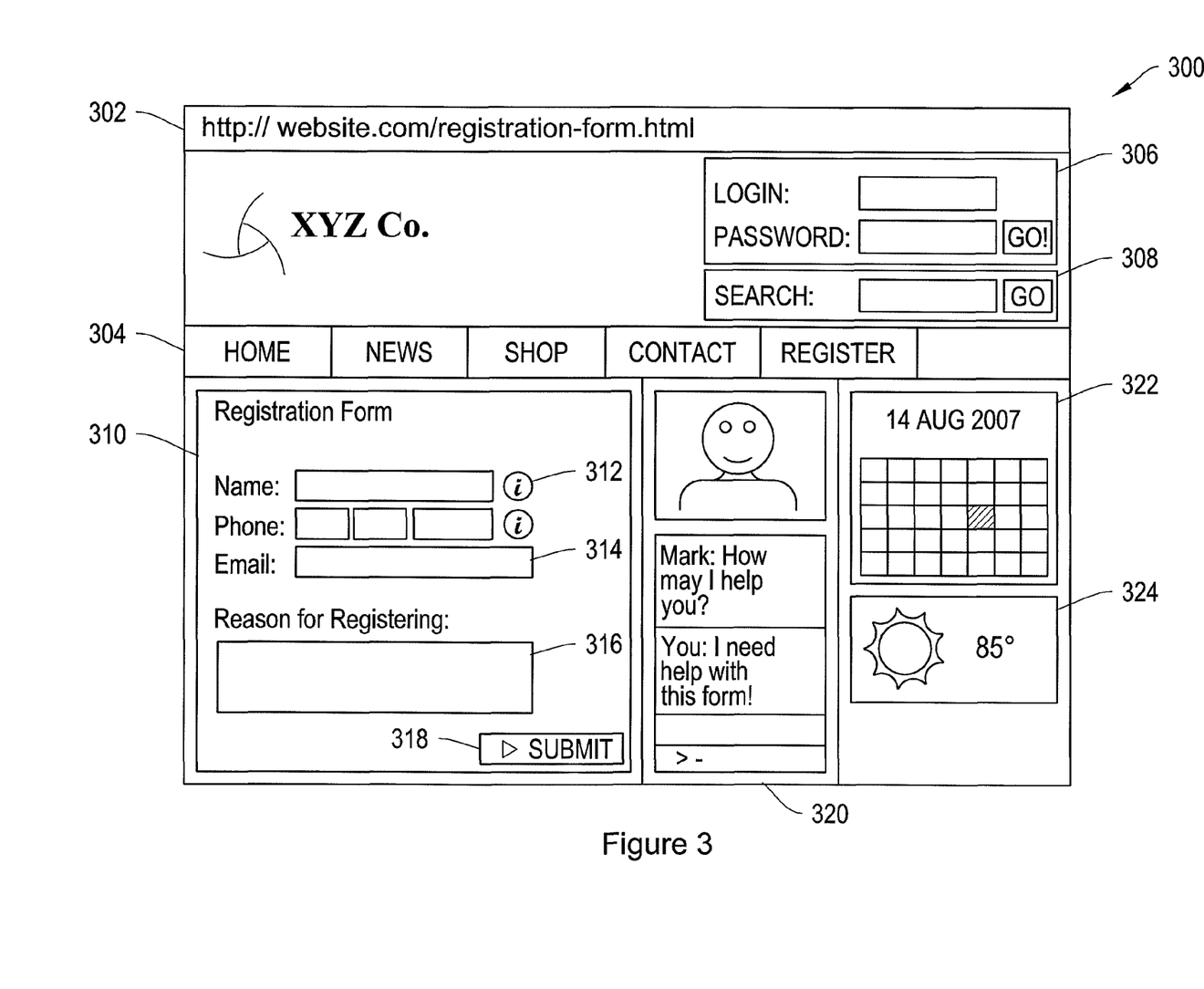
FIG. 3 show illustrative display of an illustrative web application.

FIG. 3 shows an illustrative display of an illustrative web application. In one embodiment, security system 200 collects information about functional user behavior on the web application running on web server 204, web server 206, and/or web server 102. The illustrative web application may be provided to users and clients as a web site as described in relation to FIG. 1. FIG. 3 shows screen shot 300 of a web site in an illustrative embodiment. A "register_form.html" page of the web site "website.com" is as shown in address bar 302. Hyperlinks to other parts of the web site are provided in navigation bar 304. A user may click on the "Contact" link to navigate to a different web page, or activate a script or program to send a communication to the server. User clicks, navigation to a different web page, activating a script or program to send a communication, or any other suitable user activity, may be functional user behavior tracked and monitored by behavior analysis engine 216. Clicks on a button that activates script, program, or sends a request, may be a potential vulnerability which attackers may use repetitively to slow down the server and perform a denial of service attack.

A user may provide text input for login fields 306, or text input for search field 308. The input provided along with an identification of the text field may be tracked by server object 224 in web server 204 and may be transmitted to behavior analysis engine 216 for further processing. Text fields may be vulnerable because hackers and attackers can use the field to perform a buffer overflow attack. Users may also be able to insert commands by submitting special characters in login fields 306 and search field 308, or any other input field that receives text. A hacker may also use a dictionary attack to gain access to the system via login fields 306, and the repeated attempts to gain access may be tracked as repeated sequences of "login.html" and "error.html" in the page sequence tracked by behavior analysis engine 226. The text input and the timestamped sequence of login attempts may be tracked by behavior analysis engine 216. Timestamped data of functional user behavior tracked by server object 224 and behavior analysis engine 216 may be stored in relational database 226. The timestamp is quantitative data and the pages in the repetitive sequence are qualitative data collected over a user behavior session. The timestamp and pages in the sequence may be transformed into a behavior pattern. The behavior pattern may be stored in relational database 226. The behavior pattern is used as an input to the correlation engine 218.

The web application may include form fields in registration form 310. Registration form 310 may invoke backend database queries on web server 204 and web server 206. Data provided through the form may be malformed and can cause errors on the server side. To transform the raw data (e.g., user input in registration form 310) to a behavior pattern, user input may be parsed using regular expressions to find input that poses a security threat. Multiple registrations may also be problematic for a web application and can be a common functional abuse trait for a web site. For an e-commerce web site that offers a $10 (ten dollar) gift certificate to every one who registered for the web site, multiple account registrations may be problematic and costly. Registration forms may also be vulnerable to SQL injections if the user enters a partial database query into the form field. For instance, the text including the partial database query parsed and sent to the backend database may become a malicious query requesting web server 206 to return the password of a user.

The illustrative web application shown in FIG. 3 may be configured to offer other services such as chat as shown in chat box 320, and/or provide third-party information such as weather in area 322. Chat data may be provided from other entities, such as by client 212, client 214, personal computer 104, mobile device 106, laptop 111, or by a computer program running on web server 102, web server 204 or web server 206. The third-party information may be provided by server 108 or web server 206. These enhanced services on the illustrative web application may also be vulnerable to hackers and attackers. A user may submit malicious trojans or scripts to dynamic web applications. A user may perform denial of service attacks on the servers as hackers may be able to spoof legitimate requests to those third-party servers for malicious purposes. Abuses described in relation to FIG. 3 are commonly associated with application-level attacks.

Figure 4:
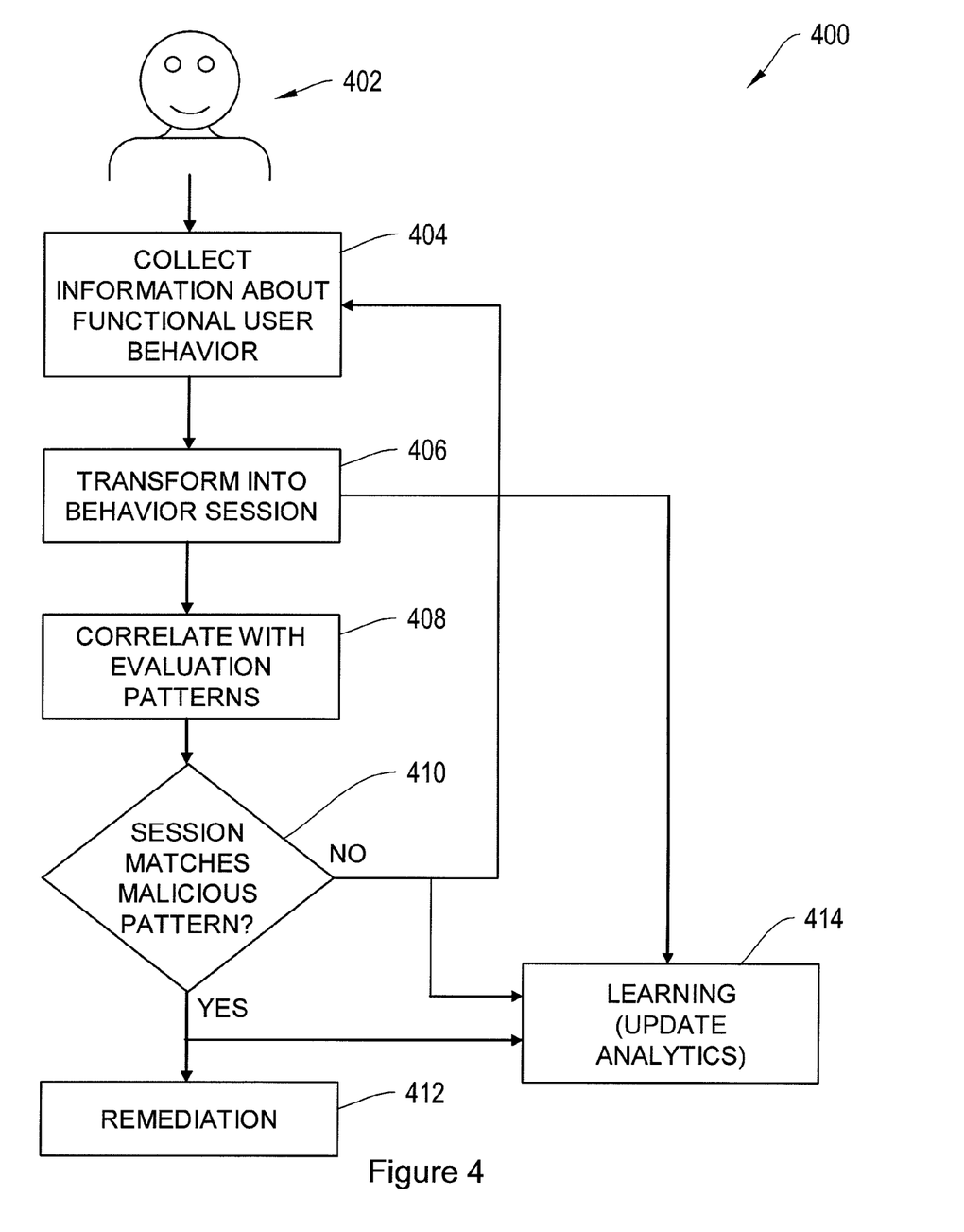
FIG. 4 is an illustrative flowchart for correlating functional user behavior with known evaluation patterns in accordance with one embodiment of the invention.

FIG. 4 is an illustrative flowchart of a process 400 involved in correlating information about functional user behavior with known evaluation patterns to detect security threats, according to an embodiment of the invention. As user 402 is using the application, qualitative and/or quantitative information about the functional user behavior is collected in step 404, as described in relation to server object 224, and behavior analysis engine 216, and FIG. 2. Step 406 transforms the information collected by server object 224 into a behavior pattern or updates the behavior pattern (e.g., as stored in relational database 226) associated with the particular user behavior session. Transformation in step 406 may be performed by behavior analysis engine 216. The process 400 then proceeds to step 408 where the behavior pattern is correlated with evaluation patterns in correlation engine 218. At step 410, the process determines whether the behavior pattern matches a malicious behavior pattern. Step 408 and step 310 may be performed by correlation engine 218.

If step 410 results in yes, the next steps in the process 400 is to execute remediation action (step 412) and learning (step 414). Any suitable server may be used to execute remediation action, such as an email server, or web server 204. If the behavior pattern is found to be a match (e.g., yes to step 410) with an evaluation pattern associated with malicious behavior, the system may automatically execute remediation action (step 414), such as notifying the system administrator, or disabling the user account on the web application. Evaluation patterns may or may not be associated with a remediation action. Remediation action associated with an evaluation pattern may be manually executed by a system administrator.

Remediation action may include modification (outside of application 116 or web server 102) such as sending an email to a system administrator with information related to the potential security threat. Remediation action may include an alert inserted in application 116 or application 222 as a pop-up on a web page to inform the user that security system 200 has detected malicious behavior. In some embodiments, remediation action includes redirecting the browser session to a blocking page hosted on another server that halts and terminates the current session, and prevents further access and use of application 116 and application 222. If the behavior pattern matches an evaluation pattern that is benign, the system may continue to collect information about functional user behavior during the user behavior session, continue to update behavior pattern, and continue to correlate the updated behavior pattern with evaluation patterns.

Updating analytics is performed by learning engine 220 in step 414, where learning engine 220 uses the information about the behavior patterns collected over time to improve behavior analysis engine 216 and correlation engine 218. The metrics used in behavior analysis engine 216 and correlation engine 218 may be continuously updated and recalculated using cumulative data collected from current and/or past behavior patterns.

If step 410 results in no, the next steps are to return to step 404 to collect more information about functional user behavior, and to update the analytics in step 414. In some embodiments, though the user behavior may not be malicious, the information in the behavior pattern is used to update behavior analysis engine 216 and/or correlation engine 218 in the learning step 414 by learning engine 220.

Figure 5:
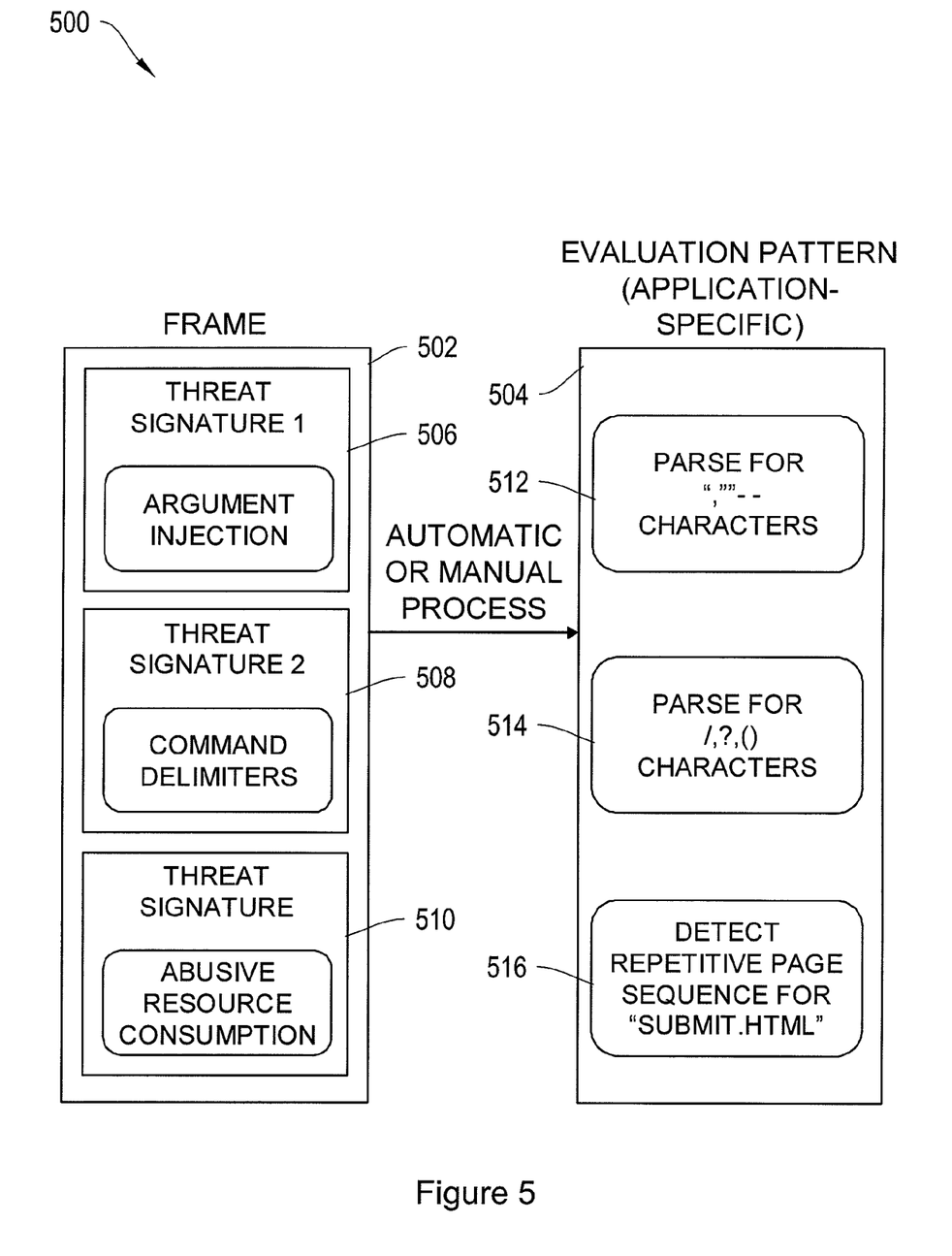
FIG. 5 is a diagram of an illustrative method for creating evaluation patterns in accordance with one embodiment of the invention.

FIG. 5 is a diagram of an illustrative method 500 for creating behavior patterns in accordance with one embodiment of the invention. As described in relation to FIG. 2, behavior patterns are correlated with evaluation patterns. In certain embodiments, frames are either manually or automatically created for a particular application-level attack. Frames include attributes such as functional abuse traits, data injection, command injection, and threat signatures. As a template for a threat signatures or a malicious behavior profile, a frame provides a modular and adaptive capability to model known application-level threat profiles as well as learned application-level threat profiles that may be specific to a host application and its users. Frame 502 or any other frames may be created manually based at least in part on a system administrator's expertise in application-level attacks. In some embodiments, frames have parameters that can be adjusted for different applications.

Frames may be generic in nature. For instance, the detection of a regular expression as part of the user input may be a frame attribute. In some embodiments, frame attributes may be associated with a particular sequence of pages, as it can be interpreted as a sign of functional abuse. Either automatically or manually, frames may be constructed or adapted to create evaluation patterns by modifying and customizing frame attributes and parameters. The adaptive capability is advantageous because a particular sequence of pages can be interpreted as malicious while a similar repetition of pages may be normal in a different kind of application.

Evaluation patterns may be created from frames, where the frame attributes are adapted for the application being protected by the system. For instance, a frame with a regular expression as a frame attribute can be modified to create an evaluation pattern by associating the frame attribute with a specific regular expression (i.e., the parameter to the frame attribute). Frames may be adapted using learning engine 220 to create new evaluation patterns. Learning engine 220 may recluster behavior patterns to create new evaluation patterns by adjusting frame attributes or evaluation patterns attributes, or parameters to reflect new patterns detected by the reclustering process.

As shown in FIG. 5, frame 502 has three threat signatures as frame attributes: argument injection 506, command delimiters 508, abusive resource consumption 510. Evaluation pattern 504 has evaluation pattern attributes. In general, frame attributes and evaluation attributes are qualitative, and the values for those attributes are qualitative and/or quantitative. Through an automatic process (e.g., using clustering methods in learning engine 220) or manual process, frame 502, its attributes and parameters can be adapted to an application and become an application-specific evaluation pattern 504. For argument injection 506, frame attribute 506 is adapted to check functional user behavior by parsing specifically for ",'"-- characters. For command delimiters 508, the evaluation pattern may check behavior patterns by parsing /, ? and ( ) characters in user input. For abusive resource consumption, the evaluation pattern may check behavior patterns for the presence of a repetitive page sequence (e.g., "submit.html" appears 25 times) in a user behavior session. Depending on the application being protected by the system, the attribute for abusive resource consumption is modified to check for a different repetitive page sequence (e.g., adapting parameters for different applications).

Information associated with functional user behavior collected by server object 224 describes the functional user activity over a user behavior session, and may be transformed to a behavior session using behavior analysis engine 212. Based on the attributes of the set of known frames and application-specific evaluation patterns, the raw data collected about the functional user behavior may be transformed by behavior analysis engine 212 into a behavior pattern in a way such that the behavior pattern can be processed and correlated easily. The transformation may be performed by mapping the raw data collected by server object 224 to attributes within the set of known frame attributes and/or evaluation pattern attributes. For instance, the mapping process may transform rows of raw data associated with functional user behavior in relational database 226 into a behavior pattern (e.g., into another row in another database table) that tracks the presence or absence of certain frame attributes and/or evaluation pattern attributes in those rows of raw data. In some embodiments, an associative array keeping track of the presence or absence of certain attributes is used to represent the behavior pattern. The behavior pattern are statistically and programmatically correlated with the set of known behavior patterns for the application.

The frames and behavior patterns can be created based at least in part of the general knowledge of types of attacks and application vulnerabilities, specific application-type and/or platform knowledge of existing vulnerabilities and previous attacks, and stochastic behavior analysis of collected behavior patterns. As discussed in relation to FIG. 2, the evaluation patterns may be updated via a reclustering process in learning engine 220. In some embodiments, the evaluation patterns are manually updated by a system administrator.

In some embodiments, application-specific behavior patterns are generated or created by the definition of specific pages to be considered for or excluded in a behavior pattern. The process of generating or creating the behavior patterns may involve configuring parameters to the frames and evaluation patterns, such as specifying the regular expressions in the attributes of the frame and/or evaluation patterns. In some embodiments, the behavior patterns are created using statistical analysis, as described in relation to the learning engine 220.

Figure 6:
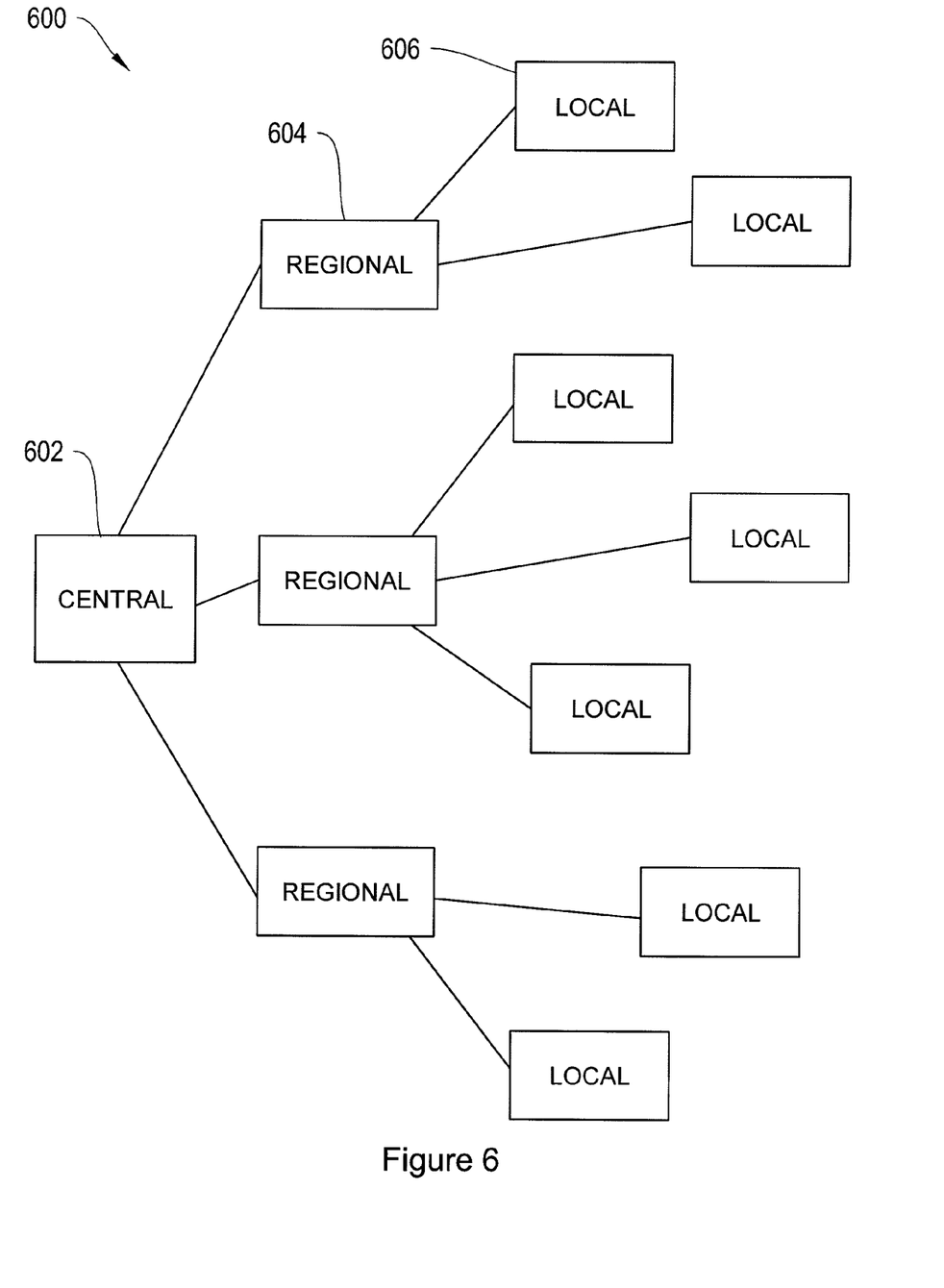
FIG. 6 is an illustrative diagram for a multi-tiered application-level security system in accordance with one embodiment of the invention.

FIG. 6 is an illustrative diagram for a multi-tiered application-level security system in accordance with one embodiment of the invention. Security system 200 may be implemented as a multi-tiered global infrastructure. Attacks are stopped closest to the source at points local to the attacks to prevent abusive and consumptive usage of resources of the host application's system. It may be advantageous to implement a plurality of local systems 606 at geographically distributed points to provide threat protection at the edge. In certain embodiments, local systems 606 may be used for threat remediation.

Data tracked over a user behavior session may be quickly synchronized across all points of protection for effective threat knowledge transfer and remediation. A plurality of regional systems 604 may be geographically located regionally and provide the hub for session detection, correlation, and analytics. Regional systems 604 may comprise at least one of: behavior analysis engine 216, correlation engine 218, and learning engine 220. Regional systems 604 may implement components of processes described in relation to FIG. 4.

At least one central system 602 may be located at major geographical points and be configured to provide the central core for reporting, management, and analytics. Central system 602 may be configured to synchronize information collected from different locations. In certain embodiments, central system 602 may be configured to process behavior patterns collected to learn new evaluation patterns, as described in relation to learning engine 220 and FIG. 4. In some embodiments, the central system 602 may be configured to perform global analysis on the performance of the system, and/or report analytical data to administrators.

It will be apparent to those of ordinary skill in the art that methods involved in the present invention may be embodied in a computer program product that includes a computer usable and/or readable medium. For example, such a computer usable medium may consist of a read only or writeable memory device, such as a CD ROM disk, DVD, flash memory stick, conventional ROM devices, or a random access memory, such as a hard drive device or a computer diskette, having a computer readable program code stored thereon.

The above described embodiments of the present invention are presented for purposes of illustration and not of limitation, and the present invention is limited only by the claims which follow.

What is claimed is:

1. A method for detecting malicious functional user behavior on a web application comprising:
   collecting a plurality of user requests sent from a client device to a web server hosting the web application during a session, wherein:
   the plurality of user requests comprise information associated with functional user behavior; and
   the web application is provided by the web server to the client device over the Internet;
   creating a behavior pattern comprising a first mapping from a plurality of qualitative attributes to respective user values in the functional user behavior, wherein the user values are derived from parsing the information associated with the functional user behavior according to the qualitative attributes;
   correlating the created behavior pattern with each evaluation pattern of a set of known evaluation patterns, wherein at least one of the known evaluation patterns is associated with malicious functional user behavior and comprises a second mapping from at least one of the plurality of qualitative attributes in the created behavior pattern to one or more respective evaluation values; and
   in response to finding a match between the behavior pattern and the evaluation pattern associated with the malicious functional user behavior from the correlation, automatically executing a remediation action associated with the matching evaluation pattern.

2. The method defined in claim 1 wherein the information associated with the functional user behavior includes at least one of: qualitative information about user activity on the web application and quantitative information about user activity on the web application.

3. The method defined in claim 1 wherein the behavior pattern comprises quantifiable information about certain qualitative functional user behavior characteristics, the qualitative functional user behavior characteristics including at least one of: user input on a web page, a web page browsing sequence, timestamp of user input, and timestamp of page visits in the browsing sequence.

4. The method defined in claim 1 wherein the user input comprises at least one of: text input, mouse clicks, cursor movements, and haptic input.

5. The method defined in claim 1 wherein the session is a user behavior session that begins at a first time when interaction with the web application begins to a second time when the interaction with the web application stops.

6. The method defined in claim 1 further comprising storing a plurality of behavior patterns over time in a data storage device.

7. The method defined in claim 1 wherein one of the evaluation values comprises a specific regular expression.

8. The method defined in claim 1 wherein one of the evaluation values comprises a particular sequence of web pages.

9. The method defined in claim 1 wherein the evaluation patterns are specific to the web application and are generated from a set of non-application specific behavior patterns.

10. The method defined in claim 1 wherein the evaluation patterns are hierarchically related.

11. The method defined in claim 1 wherein correlating comprises classifying the behavior pattern using statistical correlation algorithms and heuristics, wherein statistical correlation algorithms comprise quantitatively calculating the similarity between the behavior pattern and each of the evaluation patterns.

12. The method defined in claim 1 further comprising updating the evaluation patterns based at least in part on heuristics.

13. The method defined in claim 6 further comprising clustering behavior patterns collected against the evaluation patterns to extract one or more new evaluation patterns.

14. The method defined in claim 6 further comprising updating the evaluation patterns based at least in part on behavior patterns collected.

15. The method defined in claim 11 wherein classifying the behavior pattern is based at least in part on the presence or absence of certain functional characteristics in the behavior pattern.

16. The method defined in claim 1 wherein the remediation action comprises sending a notification to a system administrator.

17. The method defined in claim 1 wherein the remediation action comprises blocking the user from accessing the web application for a certain period of time.

18. The method defined in claim 1 wherein the remediation action comprises modifying the session by displaying an alerting on the web application.

19. The method defined in claim 1 further comprising collecting a plurality of user requests across a plurality of distributed networks and access points.

20. A system for detecting malicious functional user behavior on a web application, comprising:
    control circuitry on a server configured to receive a plurality of user requests sent from a client device to a web server hosting the web application during a session, wherein:
        the plurality of user requests comprise information associated with functional user behavior; and
        the web application is provided by the web server to the client device over the Internet;
    create a behavior pattern comprising a first mapping from a plurality of qualitative attributes to respective user values in the functional user behavior, wherein the user values are derived from parsing the information in the received user requests according to the qualitative attributes;
    a data storage in the server for storing the plurality of user requests and the behavior pattern; and
    a processor on the server for:
        correlating the created behavior pattern with each evaluation pattern of a set of known evaluation patterns, wherein at least one of the known evaluation patterns is associated with malicious functional user behavior and comprises a second mapping from at least one of the plurality of qualitative attributes in the created behavior pattern to one or more respective evaluation values;
        in response to finding a match between the behavior pattern and the evaluation pattern associated with the malicious functional user behavior, automatically executing a remediation action associated with the matching evaluation pattern.

21. The system defined in claim 20 wherein the information associated with the functional user behavior includes at least one of: qualitative information about user activity on the web application and quantitative information about user activity on the web application.

22. The system defined in claim 20 wherein the behavior pattern comprises quantifiable information about certain qualitative functional user behavior characteristics, the qualitative functional user behavior characteristics including at least one of: user input on a web page, a web page browsing sequence, timestamp of user input, and timestamp of page visits in the browsing sequence.

23. The system defined in claim 20 wherein the user input comprises at least one of: text input, mouse clicks, cursor movements, and haptic input.

24. The system defined in claim 20 wherein the session is a user behavior session that begins at a first time when interaction with the web application begins to a second time when the interaction with the web application stops.

25. The system defined in claim 20 wherein the data storage is configured for storing a plurality of behavior patterns over time.

26. The system defined in claim 20 wherein one of the evaluation values comprises a specific regular expression.

27. The system defined in claim 20 wherein one of the evaluation values comprises a particular sequence of web pages.

28. The system defined in claim 20 wherein the evaluation patterns are specific to the web application and are generated from a set of non-application specific behavior patterns.

29. The system defined in claim 20 wherein the evaluation patterns are hierarchically related.

30. The system defined in claim 20 wherein correlating comprises classifying the behavior pattern using statistical correlation algorithms and heuristics, wherein statistical correlation algorithms comprise quantitatively calculating the similarity between the behavior pattern and each of the evaluation patterns.

31. The system defined in claim 20 wherein the processor is further configured to update the evaluation patterns based at least in part on heuristics.

32. The system defined in claim 25 wherein the processor is further configured to cluster behavior patterns collected against the evaluation patterns to extract one or more new evaluation patterns.

33. The system defined in claim 25 wherein the processor is further configured to update the evaluation patterns based at least in part on behavior patterns collected.

34. The system defined in claim 30 wherein classifying the behavior pattern is based at least in part on the presence or absence of certain functional characteristics in the behavior pattern.

35. The system defined in claim 20 wherein the remediation action comprises sending a notification to a system administrator.

36. The system defined in claim 20 wherein the remediation action comprises blocking the user from accessing the web application for a certain period of time.

37. The system defined in claim 20 wherein the remediation action comprises modifying the session by displaying an alerting on the web application.

38. The system defined in claim 20 wherein the control circuitry is further configured to receive a plurality of user requests across a plurality of distributed networks and access points.

* * * * *